United States Patent
Goode et al.

(10) Patent No.: US 12,418,074 B2
(45) Date of Patent: Sep. 16, 2025

(54) BURST VALVE

(71) Applicant: Donaldson Company, Inc., Bloomington, MN (US)

(72) Inventors: Matthew J. Goode, Blaine, MN (US); Daniel J. Dotzler, Webster, MN (US); Robert O. Nelson, Eagan, MN (US)

(73) Assignee: Donaldson Company, Inc., Bloomington, MN (US)

( * ) Notice: Subject to any disclaimer, the term of this patent is extended or adjusted under 35 U.S.C. 154(b) by 27 days.

(21) Appl. No.: 18/243,007

(22) Filed: Sep. 6, 2023

(65) Prior Publication Data

US 2024/0077143 A1 Mar. 7, 2024

Related U.S. Application Data

(60) Provisional application No. 63/404,290, filed on Sep. 7, 2022.

(51) Int. Cl.
*H01M 50/342* (2021.01)
*F16K 17/16* (2006.01)
*F16K 17/40* (2006.01)

(52) U.S. Cl.
CPC ..... *H01M 50/3425* (2021.01); *F16K 17/1626* (2013.01); *F16K 17/403* (2013.01)

(58) Field of Classification Search
CPC .............. F16K 17/403; F16K 17/1626; H01M 50/3425
See application file for complete search history.

(56) References Cited

U.S. PATENT DOCUMENTS 2,922,833 A * 1/1960 Phillip .............. H01M 50/3425
                                                              429/56
3,062,910 A * 11/1962 Schenk, Jr. ......... H01M 50/167
                                                              429/185

(Continued)

FOREIGN PATENT DOCUMENTS

CN         101142698 A     3/2008
CN         201408794 Y     2/2010

(Continued)

OTHER PUBLICATIONS

Donaldson Filtration Solutions, "Enclosure Protection Vents for Automotive Battery Packs," 2019-2022, Donaldson Company, Inc., 4 pages.

(Continued)

*Primary Examiner* — David Colon-Morales
(74) *Attorney, Agent, or Firm* — Mueting Raasch Group

(57) ABSTRACT

A valve assembly is disclosed that has a valve housing including a first axial end, a cap, a second axial end, and an airflow pathway extending from the first axial end towards the second axial end. The cap is positioned towards the second axial end. The valve housing includes an environmental opening configured for fluid communication with an outside environment, an enclosure opening towards the first axial end configured for fluid communication with an interior of an enclosure, and a film having an expansion diameter disposed in the valve housing laterally across the airflow pathway. The cap has an inner lateral surface and a piercing protrusion (having a piercing tip) extending from the inner lateral surface towards the first axial end. An axial distance is defined between the film and the inner lateral surface. A ratio of the axial distance to the film expansion diameter is at least 0.14.

20 Claims, 8 Drawing Sheets

(56) References Cited

U.S. PATENT DOCUMENTS

| | | | |
|---|---|---|---|
| 3,214,300 A * | 10/1965 | Nordvik | H01M 50/169 429/56 |
| 3,314,824 A | 4/1967 | Spanur | |
| 3,415,690 A * | 12/1968 | Richman | H01M 10/34 429/185 |
| 3,989,057 A * | 11/1976 | Muddiman | F16K 17/1626 137/68.24 |
| 4,207,385 A * | 6/1980 | Hayama | H01M 50/3425 429/56 |
| 4,307,158 A * | 12/1981 | Thibault | H01M 50/3425 429/185 |
| 4,345,611 A * | 8/1982 | Ikeda | H01M 50/3425 137/68.25 |
| 4,552,821 A * | 11/1985 | Gibbard | H01M 10/34 429/57 |
| 5,660,944 A | 8/1997 | Sprengel et al. | |
| 5,752,746 A | 5/1998 | Perry | |
| 5,860,708 A | 1/1999 | Borders et al. | |
| 6,042,967 A | 3/2000 | Sergeant et al. | |
| 6,733,917 B1 | 5/2004 | Janmey | |
| 6,887,618 B2 | 5/2005 | Shelekhin et al. | |
| 7,378,180 B2 | 5/2008 | Causton et al. | |
| 7,572,544 B2 | 8/2009 | Kozuki et al. | |
| 7,799,109 B2 | 9/2010 | Dunsch et al. | |
| 8,069,875 B2 | 12/2011 | Mashiko | |
| 8,357,462 B2 * | 1/2013 | Zhu | H01M 50/3425 429/56 |
| 8,517,042 B2 | 8/2013 | Khamitkar | |
| 8,802,254 B2 | 8/2014 | Lee | |
| 8,807,154 B2 | 8/2014 | Khamitkar | |
| 9,061,811 B2 | 6/2015 | Egersdoerfer et al. | |
| 9,105,902 B2 | 8/2015 | Tyler et al. | |
| 9,153,386 B2 | 10/2015 | Okada et al. | |
| 9,293,792 B2 | 3/2016 | Grace et al. | |
| 9,397,325 B2 | 7/2016 | Kinuta et al. | |
| 9,428,304 B2 | 8/2016 | Scagliarini et al. | |
| 9,735,407 B2 | 8/2017 | Kusunoki et al. | |
| 9,899,652 B2 | 2/2018 | Goldman et al. | |
| 9,958,489 B2 | 5/2018 | Stichowski et al. | |
| 10,020,477 B2 * | 7/2018 | Lomax | H01M 50/278 |
| 10,164,227 B2 | 12/2018 | Hofer | |
| 10,403,944 B2 | 9/2019 | Obrist et al. | |
| 10,529,970 B2 | 1/2020 | Albukrek et al. | |
| 10,557,561 B2 | 2/2020 | Kleinke et al. | |
| 11,705,589 B2 * | 7/2023 | He | F16K 24/00 429/61 |
| 2003/0215698 A1 | 11/2003 | Schulte-Ladbeck | |
| 2003/0220067 A1 | 11/2003 | Mashiko et al. | |
| 2008/0199763 A1 | 8/2008 | Ito et al. | |
| 2010/0233520 A1 | 9/2010 | Suzuki et al. | |
| 2012/0000548 A1 | 1/2012 | Khamitkar | |
| 2012/0282499 A1 * | 11/2012 | Eichinger | H01M 50/3425 429/56 |
| 2013/0032219 A1 * | 2/2013 | Heim | H01M 50/3425 137/197 |
| 2013/0216871 A1 | 8/2013 | Lee et al. | |
| 2014/0053916 A1 | 2/2014 | Khamitkar | |
| 2014/0120387 A1 | 5/2014 | Kinuta et al. | |
| 2015/0030893 A1 | 1/2015 | Mack et al. | |
| 2015/0034172 A1 | 2/2015 | Khamitkar | |
| 2015/0217417 A1 | 8/2015 | Takeshita | |
| 2016/0036025 A1 | 2/2016 | Hofer | |
| 2016/0172644 A1 | 6/2016 | Goldman et al. | |
| 2016/0365553 A1 | 12/2016 | Kountz et al. | |
| 2017/0187018 A1 | 6/2017 | Pflueger et al. | |
| 2017/0187050 A1 | 6/2017 | Weissberger et al. | |
| 2018/0017462 A1 | 1/2018 | Kube | |
| 2018/0062134 A1 | 3/2018 | Bauer | |
| 2018/0219200 A1 | 8/2018 | Albukrek et al. | |
| 2020/0280030 A1 | 9/2020 | Waha et al. | |
| 2021/0367283 A1 * | 11/2021 | He | F16K 24/00 |
| 2021/0396323 A1 | 12/2021 | Nakayama et al. | |
| 2023/0307780 A1 * | 9/2023 | Tschech | H01M 50/394 |

FOREIGN PATENT DOCUMENTS

| | | | |
|---|---|---|---|
| CN | 103531730 A | 1/2014 | |
| CN | 103928646 A | 7/2014 | |
| CN | 104425786 A * | 3/2015 | H01M 2/1247 |
| CN | 104425786 B | 3/2017 | |
| CN | 107278338 A | 10/2017 | |
| CN | 104577001 B | 11/2017 | |
| CN | 209434272 U | 9/2019 | |
| DE | 2540002 A1 | 3/1977 | |
| DE | 3539167 A1 | 5/1986 | |
| DE | 102006059034 B3 | 8/2008 | |
| DE | 102008061493 A1 | 6/2010 | |
| DE | 102009020185 A1 | 11/2010 | |
| DE | 102010014484 A1 | 3/2011 | |
| DE | 102010045160 A1 | 3/2012 | |
| DE | 102012011443 A1 | 12/2012 | |
| DE | 102011111581 A1 | 2/2013 | |
| DE | 102012215058 A1 | 2/2014 | |
| DE | 102011015925 B4 | 4/2014 | |
| DE | 102012022346 A1 | 5/2014 | |
| DE | 102013007330 A1 | 10/2014 | |
| DE | 102013009212 A1 | 12/2014 | |
| DE | 102013213909 A1 | 1/2015 | |
| DE | 102013218911 A1 | 3/2015 | |
| DE | 102014111041 A1 | 2/2016 | |
| DE | 102014223303 A1 | 5/2016 | |
| DE | 102015214714 A1 | 2/2017 | |
| DE | 102016100413 A1 | 7/2017 | |
| DE | 102016125305 A1 | 12/2017 | |
| DE | 202020101150 U1 | 3/2020 | |
| EP | 0554535 A1 | 8/1993 | |
| EP | 0798793 A2 * | 10/1997 | |
| EP | 0984498 B1 | 11/2002 | |
| EP | 1930654 B1 | 7/2011 | |
| EP | 2554882 A1 | 2/2013 | |
| EP | 2425475 B1 | 5/2014 | |
| EP | 3271956 B1 | 2/2019 | |
| FR | 2212019 A5 | 7/1974 | |
| FR | 2551172 A1 | 3/1985 | |
| FR | 2969394 A1 | 6/2012 | |
| GB | 2201859 A | 9/1988 | |
| JP | 2002-521805 A | 7/2002 | |
| JP | 59-13469 B2 | 4/2016 | |
| KR | 20060086124 A | 7/2006 | |
| WO | WO 1996008048 A1 | 3/1996 | |
| WO | WO 2007145969 A2 | 12/2007 | |
| WO | WO 2012019371 A1 | 2/2012 | |
| WO | WO 2012050343 A2 | 4/2012 | |
| WO | WO 2013121990 A1 | 8/2013 | |
| WO | WO 2015180971 A1 | 12/2015 | |
| WO | WO 2016177687 A1 | 11/2016 | |
| WO | WO 2017017199 A1 | 2/2017 | |
| WO | WO 2017021017 A1 | 2/2017 | |
| WO | WO 2018119242 A1 | 6/2018 | |
| WO | 2021105052 A1 | 6/2021 | |
| WO | WO 2020085210 A1 | 9/2021 | |

OTHER PUBLICATIONS

Mann + Hummel, "VentPlus Venting Units for high-voltage battery systems," Mann + Hummel, Apr. 2023, 5 pages.

Voir, "VE-EPVM42034-B30," Voir Waterproof and Air Permeable Professional Protective Solution Provider, Retrieved Aug. 29, 2023, 2 pages.

PCT Patent Application No. PCT/US2023/032112, filed Sep. 6, 2023, International Search Report and Written Opinion mailed on Feb. 26, 2024, 11 pages.

* cited by examiner

BURST VALVE

This application claims priority to U.S. Provisional Patent Application Ser. No. 63/404,290, filed Sep. 7, 2022, the disclosure of which is incorporated herein by reference.

TECHNOLOGICAL FIELD

The present disclosure is generally related to a valve assembly. More particularly, the present disclosure is related to a burst valve for an enclosure.

BACKGROUND

Various situations require conditions that allow the ability to release pressure from an enclosure. For example, applications within electronics enclosures, such as batteries, that contain sensitive electronic components and equipment, as well as a heat source, often require that pressure levels within the enclosure be maintained and regulated to operate consistently. An improper level of pressure can interfere with mechanical and electrical operations of the components and equipment.

It can also be desirable to prevent contaminants or pollutants from the ambient environment within the enclosed environment. Contaminants can reduce the efficiency and longevity of the components within the enclosure. Such contaminants can enter the enclosure from external sources, and the contaminants can gradually damage the valve or the enclosure, resulting in deterioration of performance and even complete failure of the device. Consequently, the valve assembly may have one or more films capable of removing moisture and contaminants in any air entering the device, such as breathable membranes.

SUMMARY

The technology disclosed herein relates to a valve assembly that is configured to have improved bursting of a film at or above a set pressure differential between the ambient environment and the enclosure. In some embodiments the technology disclosed herein improves the ability to consistently burst a film at or above a set pressure differential. Improved bursting of film may reduce damage to the enclosure. Such improvements may be realized by having a cap height of the valve assembly such that the film can flex or expand into the cap until the film bursts open. Such improvements may be realized by having a piercing protrusion pierce the film when it flexes or expands. Such improvements may be realized by having a ratio of a film expansion diameter to a distance between the film and an inner surface of the cap such that the film can flex or expand into the distance until the film bursts open.

In one or more embodiments, the valve assembly includes a valve housing. The valve housing includes a first axial end, a cap, a second axial end, and an airflow pathway. The airflow pathway extends from the first axial end towards the second axial end. The cap is positioned towards the second axial end. The valve housing further includes an environmental opening. The environmental opening is configured for fluid communication with an outside environment. The valve housing further includes an enclosure opening towards the first axial end. The enclosure opening is configured for fluid communication with an interior of an enclosure. The valve housing further includes a film. The film is disposed in the valve housing laterally across the airflow pathway. The film is disposed in the valve housing along the airflow pathway between the enclosure opening and the environmental opening. The cap has an inner lateral surface and a piercing protrusion. The piercing protrusion extends from the inner lateral surface of the cap towards the first axial end. The piercing protrusion includes a piercing tip. An axial distance between the film and the inner lateral surface of the cap is greater than 4.4 mm.

In some such embodiments, the axial distance between the film and the inner lateral surface of the cap is at least 7.4 mm. Additionally or alternatively, the piercing protrusion is configured to pierce the film when a pressure differential between the enclosure opening and the environmental opening rises above a burst threshold. Additionally or alternatively, the burst threshold is at least 50 mbar. Additionally or alternatively, a distance between the film and the piercing protrusion is 1 mm to 3 mm. Additionally or alternatively, a length of the piercing protrusion is at least 2 mm.

Additionally or alternatively, the cap has a cap sidewall extending from the inner lateral surface towards the first axial end. The cap sidewall defines a cap height. Additionally or alternatively, the cap has a cap base. The cap sidewall extends from the inner lateral surface to the cap base. The piercing protrusion extends beyond the cap base towards the first axial end by at least 1 mm. Additionally or alternatively, the cap height is at least 2 mm. Additionally or alternatively, the valve housing further includes a housing sidewall extending between the inner lateral surface and the first axial end.

Additionally or alternatively, the valve assembly further includes a void space. The void space is defined among the piercing protrusion, the housing sidewall, the inner lateral surface, and the film. Additionally or alternatively, the film includes a breathable membrane. Additionally or alternatively, airflow through the airflow pathway is configured to increase by at least 12 times after the film is pierced compared to airflow through the airflow pathway before the film is pierced. Additionally or alternatively, the film includes a non-breathable membrane. Additionally or alternatively, a surface area of an expansion area of the film is 450 square mm to 1500 square mm. Additionally or alternatively, the piercing protrusion tapers towards the first axial end.

In one or more embodiments, the valve assembly includes a valve housing. The valve housing includes a first axial end, a cap, a second axial end, and an airflow pathway. The airflow pathway extends from the first axial end towards the second axial end. The cap is positioned towards the second axial end. The valve housing further includes an environmental opening. The environmental opening is configured for fluid communication with an outside environment. The valve housing further includes an enclosure opening towards the first axial end. The enclosure opening is configured for fluid communication with an interior of an enclosure. The valve housing further includes a film. The film is disposed in the valve housing laterally across the airflow pathway. The film is disposed in the valve housing along the airflow pathway between the enclosure opening and the environmental opening. The film has an expansion diameter. The cap has an inner lateral surface and a piercing protrusion. The piercing protrusion extends from the inner lateral surface of the cap towards the first axial end. The piercing protrusion has a piercing tip. An axial distance is defined between the film and the inner lateral surface. A ratio of the axial distance to the film expansion diameter is greater than 0.135.

In some such embodiments, the axial distance between the film and the inner lateral surface of the cap is at least 7.4 mm. Additionally or alternatively, the ratio of the axial distance to the expansion diameter is at least 0.228. Additionally or alternatively, the piercing protrusion is configured to pierce the film when a pressure differential between the enclosure opening and the environmental opening rises above a burst threshold. Additionally or alternatively, the burst threshold is at least 50 mbar. Additionally or alternatively, a distance between the film and the piercing protrusion is 1 mm to 3 mm. Additionally or alternatively, a length of the piercing protrusion is at least 2 mm.

Additionally or alternatively, the cap includes a cap sidewall extending from the inner lateral surface towards the first axial end. The cap sidewall defines a cap height. Additionally or alternatively, the cap includes a cap base. The cap sidewall extends from the inner lateral surface to the cap base. The piercing protrusion extends beyond the cap base towards the first axial end by at least 1 mm. Additionally or alternatively, the cap height is at least 2 mm. Additionally or alternatively, the valve housing further includes a housing sidewall extending between the inner lateral surface and the first axial end.

Additionally or alternatively, the valve assembly further includes a void space. The void space is defined among the piercing protrusion, the housing sidewall, the inner lateral surface, and the film. Additionally or alternatively, the film includes a breathable membrane. Additionally or alternatively, airflow through the airflow pathway is configured to increase by at least 12 times after the film is pierced compared to airflow through the airflow pathway before the film is pierced. Additionally or alternatively, the film includes a non-breathable membrane. Additionally or alternatively, the film expansion diameter is at least 32.5 mm. Additionally or alternatively, a surface area of an expansion area of the film is 450 square mm to 1500 square mm. Additionally or alternatively, the piercing protrusion tapers towards the first axial end.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

The present technology may be more completely understood and appreciated in consideration of the following detailed description of various embodiments in connection with the accompanying drawings.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION

Valve assemblies consistent with the technology disclosed herein can have a variety of different configurations. FIGS. 1-4 depict one example embodiment of a valve assembly 100, and FIGS. 1-4 can be viewed together with the following description. A valve assembly 100 is disclosed that generally has a valve housing 16, a film 20, and a piercing protrusion 12.

Figure 3:
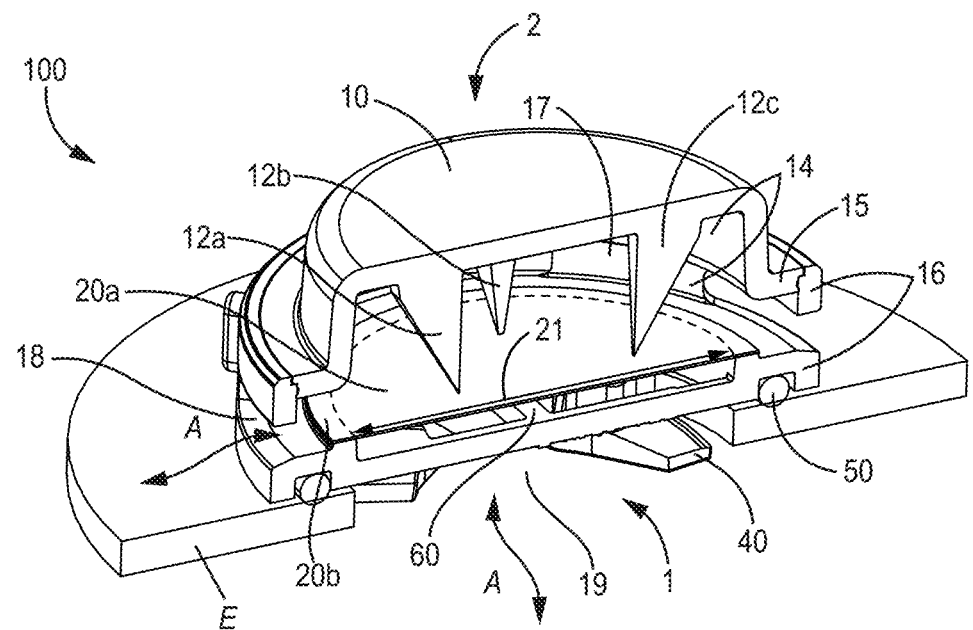
FIG. 3 is a perspective cross-sectional view consistent with the example of FIG. 1.
Figure 4:
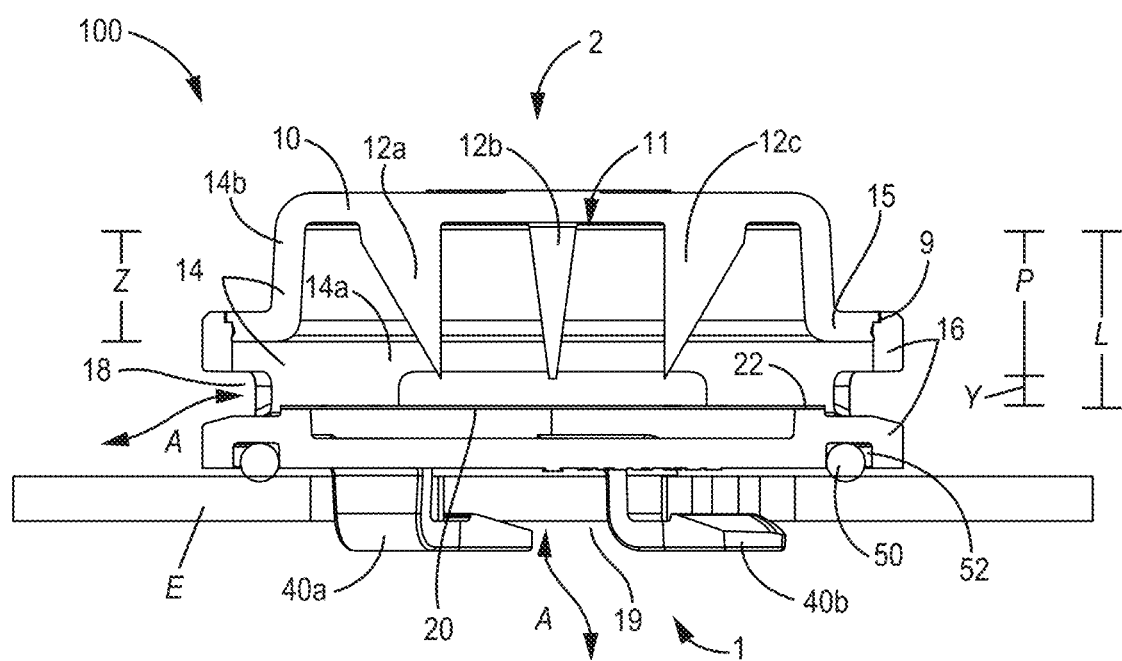
FIG. 4 is a cross-sectional view consistent with the example of FIG. 1.

The valve assembly 100 is configured to be disposed in a receptacle of an enclosure, E, a portion of an example of which is illustrated in FIGS. 3-4. The valve assembly 100 is generally configured to relieve pressure in the enclosure E that is above a threshold pressure differential between the enclosure and the environment outside of the enclosure. In some implementations, the valve assembly 100 can be configured to have improved reliability for pressure release above the threshold pressure differential compared to some existing pressure relief devices. The valve assembly 100 is generally configured to burst open the film 20 such that the film 20 is opened to allow pressure relief. The valve assembly 100 is generally configured to puncture and burst the film 20 when the pressure differential between an enclosure opening 19 and an environmental opening 18 rises above the threshold pressure differential, which is referred to herein as the burst threshold.

The valve housing 16 has a first axial end 1, a cap 10, a second axial end 2 opposite the first axial end 1, an airflow pathway A extending from the first axial end 1 towards the second axial end 2, the environmental opening 18 and the enclosure opening 19. The valve housing 16 is generally configured to contain various components of the valve assembly, including the film 20. The valve housing 16 can be constructed of a variety of different materials and combinations of materials. In some embodiments the valve housing 16 is a molded plastic. In another embodiment the valve housing 16 is a metal. In one example, at least a portion of the valve housing 16 is an injection-molded plastic, 3D printed plastic or other material, etc.

Figure 1:
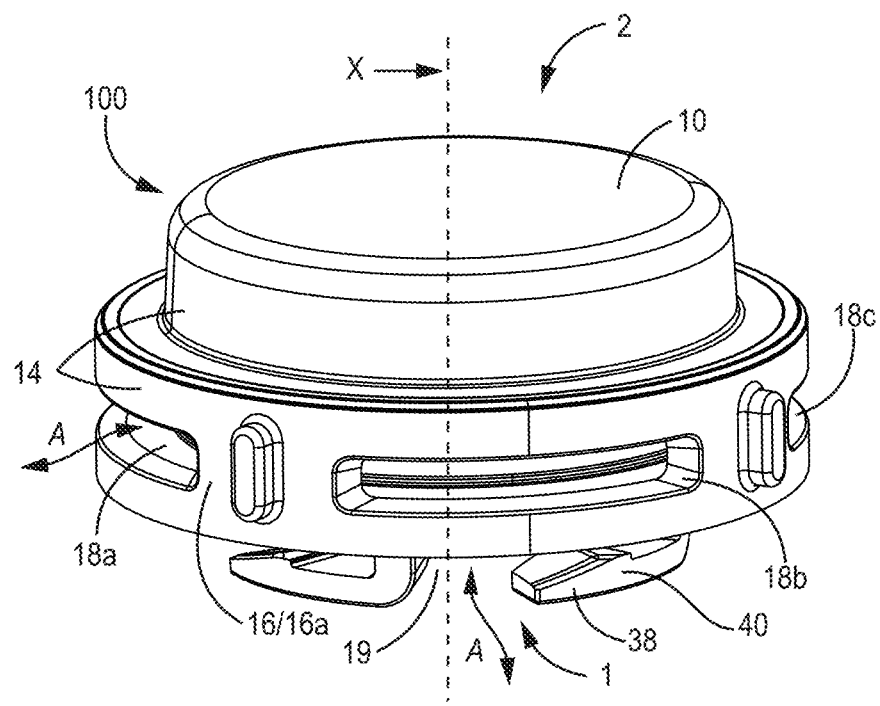
FIG. 1 is a first perspective view of an example valve assembly consistent with various embodiments.

The airflow pathway A is generally defined by the valve housing 16. The airflow pathway A is configured to fluidly connect the environmental opening 18 and the enclosure opening 19. The airflow pathway A can be defined by the valve housing 16 such that the valve housing 16 surrounds the airflow pathway A. The airflow pathway A can also be defined by the cap 10 of the valve housing 16. In some embodiments, the airflow pathway A may allow for airflow in two directions (as illustrated in FIGS. 1, 3, and 4). In alternative embodiments, the airflow pathway A may obstruct airflow from the enclosure opening 19 towards the environmental opening 18 until the film 20 is burst. Once the film 20 is burst, or once the burst threshold is reached, then the airflow pathway A may allow for two-way airflow.

The enclosure opening 19 is generally configured for fluid communication with an interior of the enclosure E. The enclosure opening 19 is generally configured to define a portion of the airflow pathway A. The enclosure opening 19 is positioned towards the first axial end 1. In the current example, the enclosure opening 19 faces the axial direction, meaning that the enclosure opening 19 is perpendicular to a central axis of the valve housing 16. In alternative embodiments, the enclosure opening 19 can face a lateral direction. The enclosure opening 19 can be defined by a body 16a of the valve housing 16. The valve housing 16 can be configured to be sealably coupled to the enclosure E. In some embodiments, the enclosure opening 19 is the only source of airflow A into or out of the enclosure E.

The enclosure opening 19 can define a variety of shapes and sizes. Further, the enclosure opening 19 can include one or more openings that cumulatively define the enclosure opening.

The environmental opening 18 is generally configured for fluid communication with the outside environment, which can be the ambient environment. The environmental opening 18 is generally configured to define a portion of the airflow pathway A. The environmental opening 18 (18a-c as illustrated in FIG. 1) can be between the first axial end 1 and the second axial end 2. In alternative embodiments, the environmental opening(s) 18 can be positioned towards the second axial end 2 relative to the enclosure opening 19. The environmental opening 18 can include one or more openings. The environmental opening 18 can include, for example, four environmental openings (18a-c as illustrated, and an additional opening can be opposite opening 18b, although it is not visible in FIG. 1), or more than four environmental openings 18.

The environmental opening(s) 18 can be defined laterally around the valve housing 16. In alternative embodiments, the environmental opening(s) 18 can be defined by, for example, the cap 10. The environmental opening 18 can face in the lateral direction, as illustrated in FIGS. 1-4. In alternative embodiments, the environmental opening 18 can face in an axial direction (not illustrated). For example, the environmental opening 18 can be defined at the second axial end 2 and face in the axial direction.

Figure 2:
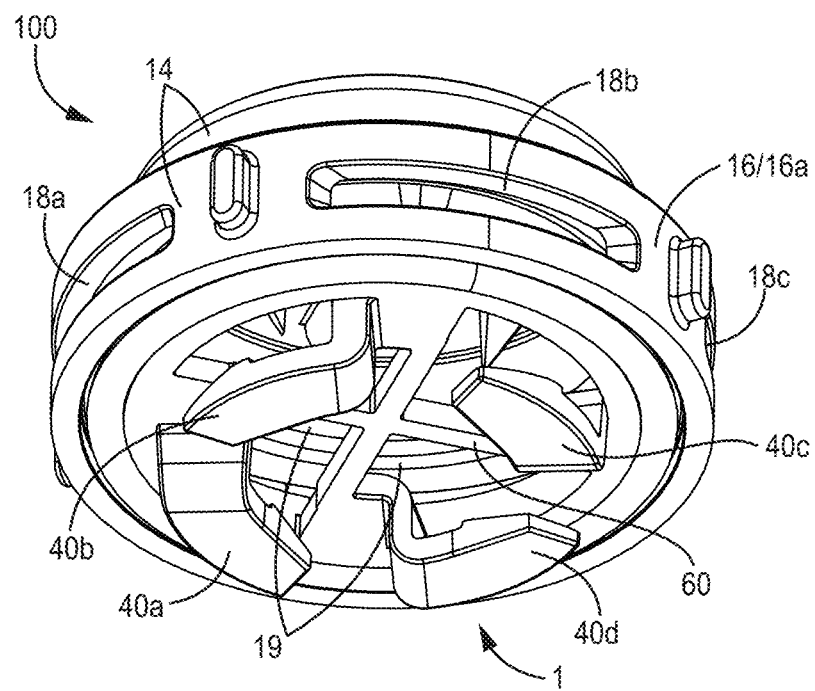
FIG. 2 is a second perspective view consistent with the example of FIG. 1.

The valve housing 16 is generally configured to engage with the enclosure E (such as, e.g., a battery enclosure) via a mounting structure 38 as illustrated in FIG. 1. Such engagement may be, for example, a bayonet engagement, a threadable engagement, a snap fit engagement, a fastener engagement, or a welded engagement, to sealably connect the valve assembly 100 to the enclosure E. As illustrated in FIGS. 1-4, the valve housing 16 can include a bayonet connector 40 (40a-d as illustrated in FIG. 2). The bayonet connector 40 is configured to sealably couple the valve assembly 100 to the enclosure E. The bayonet connector 40 can be configured to engage a mating structure defined by the enclosure E. The bayonet connector 40 can include one or more tabs which extend away from the first axial end 1 of the valve housing 16. The bayonet connector 40 can define the enclosure opening(s) 19.

The valve assembly 100 can further include a seal 50 (as illustrated in FIGS. 3-4). The seal 50 can be, for example, an o-ring or gasket. The seal 50 can be rubber or another elastomeric material. In some embodiments, the seal 50 is configured to seal the valve assembly 100/valve housing 16 to the enclosure E. The seal 50 is generally configured to prevent airflow from bypassing the valve assembly 100. In alternative embodiments, the seal 50 may be a weld, for example, or an adhesive. The seal 50 can be disposed within a seal receptacle 52 defined by the valve housing 16 as illustrated in FIG. 4. The seal 50 can fully surround the enclosure opening 19.

The valve assembly 100 can further include the film 20 disposed in the valve housing 16 (as illustrated in FIGS. 3-4). The film 20 is generally configured to burst open and allow pressure relief at or above the burst threshold. Prior to bursting, the film 20 is generally configured to obstruct contaminants from moving into or out of the enclosure opening 19.

The film 20 is disposed laterally across the airflow pathway A. The film 20 can be disposed along the airflow pathway between the enclosure opening 19 and the environmental opening 18. The film 20 is generally configured to be coupled to the valve housing 16. The film 20 can have a perimetric region 20b that is bonded to the valve housing 16. The valve housing 16 can define a mounting surface 22 around the airflow pathway A that is sealably coupled to the perimetric region 20b of the film 20. The mounting surface 22 can be positioned between the first end 1 and the second end 2. In some embodiments the perimetric region 20b is welded to the valve housing 16. In other embodiments, the film 20 has a support ring (which may or may not be circular) to support the perimetric region 20b, and the support ring is coupled to the vent housing. In still other embodiments, the perimetric region 20b is coupled to the valve housing 16 with adhesive. An expansion area 20a (partially visible in FIG. 3) of the film 20 is an unbonded area of the film 20 surrounded by the perimetric region 20b. The expansion area 20a is expandable in response to a pressure differential between the enclosure opening 19 and the environmental opening(s) 18. The expansion area 20a can be characterized by an expansion diameter 21 (illustrated in FIG. 3). The expansion diameter 21 is defined as a diameter across a circle that is circumscribed by the expansion area 20a of the film 20.

Figure 5:
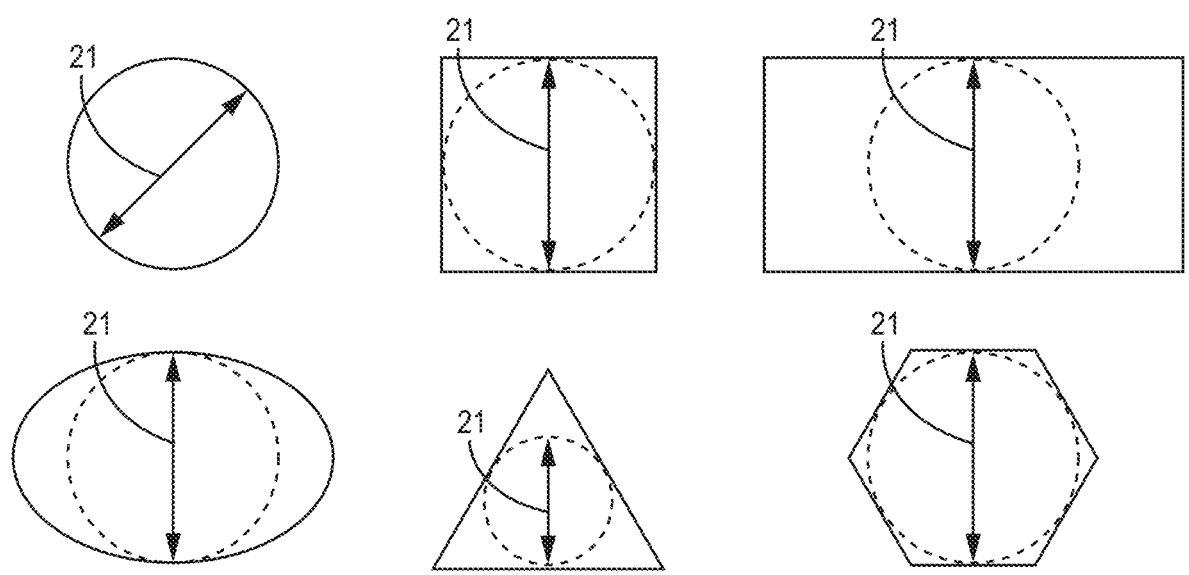
FIG. 5 is a schematic facing view of a variety of shapes of expansion areas of films consistent with the technology disclosed herein.

The expansion diameter 21 defines a region of maximum tension of the film during expansion, which limits the deflection of the film. In the current example, the expansion area 20a is circular in shape, and the expansion diameter 21 is the diameter of the expansion area 20a. In one or more alternative embodiments, the expansion area 20a is not circular, some examples of which are depicted in FIG. 5. In such embodiments, the expansion diameter 21 may be less than a cross-dimension of the expansion area 20a. In FIG. 5, the perimetric region 20b is not currently depicted, but would be located around the perimeter of each expansion area 20a. As discussed above, the perimetric region is configured to be coupled to the valve housing around the airflow pathway.

The surface area of the expansion area 20a is measured when the expansion area is in an undeflected state, such as when the pressure differential across the film is zero. The surface area of the expansion area can be 450 square millimeters (mm) to 1500 square mm. In alternative embodiments, the surface area of the film 20 can be at least 350 square mm, at least 400 square mm, at least 450 square mm, at least 500 square mm, at least 600 square mm, at least 700 square mm, at least 800 square mm, at least 900 square mm, at least 1000 square mm, at least 1100 square mm, at least 1200 square mm, at least 1300 square mm, at least 1400 square mm, or at least 1500 square mm. In further alternative embodiments, the area of the film 20 can be less than 1500 square mm, less than 1400 square mm, less than 1300 square mm, less than 1200 square mm, less than 1100 square mm, less than 1000 square mm, less than 900 square mm, less than 800 square mm, less than 700 square mm, less than 600 square mm, less than 500 square mm, less than 450 square mm, less than 400 square mm, or less than 350 square mm.

In one or more embodiments, the film 20 can be a breathable membrane. In such embodiments, the film 20 is configured to prevent particles from passing through the enclosure opening 19. In some embodiments, the film 20 is also configured to prevent liquids passing through the enclosure opening 19. The film 20 may be configured to filter particulate or debris from the air as it flows along the airflow pathway A. The film 20 may be configured to control humidity in the enclosure E by filtering water from the air as it flows along the airflow pathway A. In some embodiments the film 20 allows passive venting between the enclosure opening 19 and the environmental opening 18 along the airflow pathway A.

In alternative embodiments, the film 20 can be a non-breathable membrane meaning that there is no measurable airflow through the rupture valve 280 at room temperature with 20 mbar pressure differential. In some embodiments the film 20 has a moisture vapor transmission rate of 0.0 at 73° F. and 50% relative humidity in accordance with ASTM E96-00 (2021). In such alternative embodiments, airflow is obstructed between the environmental opening and the enclosure opening 19 along the airflow pathway A. In some embodiments the film 20 defines selective communication between the enclosure opening 19 and the environmental opening 18 along the airflow pathway. Such selective communication can be, for example, pressure relief from the enclosure opening 19 to the environmental opening 18 when the pressure differential reaches or exceeds the burst threshold.

The film 20 can be constructed of a variety of different materials and combinations of materials. In various embodiments the film 20 incorporates a breathable membrane, such as polytetrafluoroethylene (PTFE) or other types of breathable membranes. The film 20 can be a laminate or composite that includes a breathable membrane, such as a PTFE laminated to a woven or non-woven support layer. In some embodiments, the film 20 is a woven fabric or a non-woven fabric. The film 20 can be constructed of hydrophobic material, or the film 20 can be treated to exhibit hydrophobic properties. In one example, the film 20 is a hydrophobic woven or non-woven fabric. The film 20 can be constructed of an oleophobic material, or the film 20 can be treated to exhibit oleophobic properties. In one example, the film 20 is an oleophobic woven or non-woven fabric. In some embodiments the film 20 is constructed of a non-breathable PTFE. In some such embodiments the film 20 can be an unexpanded PTFE. In some such embodiments the film 20 can be a non-porous PTFE. In some embodiments the PTFE is skived PTFE. In some embodiments the PTFE is a cast PTFE. PTFE materials may advantageously have relatively high thermal and mechanical stability compared to some other materials. Other types of polymeric materials are also contemplated. In various embodiments the film 20 is liquid impermeable.

The valve housing 16 may further include a support brace 60 (as visible in FIGS. 2-3). The support brace 60 may be configured to provide stability and support to the film 20. In some embodiments the support brace 60 is configured to limit deflection of the film 20 towards the first end 1. In the embodiment shown, the support brace 60 may include one or more support braces 60 arranged laterally across the airflow pathway A. In alternative embodiments, the support brace(s) 60 can be arranged circumferentially around the airflow pathway A. The support brace(s) 60 can define the enclosure opening(s) 19.

The valve assembly 100 may include a housing sidewall 14 (illustrated in FIGS. 3 and 4). The housing sidewall 14 is an axially-extending structure that laterally surrounds the airflow pathway A. The housing sidewall 14 generally extends in the axial direction between the first end 1 and the second end 2. In this example, the housing sidewall 14 extends in the axial direction from the film 20 (or mounting surface 22) towards the second end 2. The housing sidewall 14 can be disposed around the central axis X of the valve housing 16. The housing sidewall 14 is disposed around the film 20. The housing sidewall 14 is positioned laterally outward from the expansion area 20a, in some embodiments. The housing sidewall 14 can be configured to partially isolate the airflow pathway A from the surrounding environment. The housing sidewall 14 can be configured to protect the film 20 from direct impact by debris in the outside environment. The environmental opening(s) 18 can be defined by the housing sidewall 14, laterally around the valve housing 16.

As mentioned above, the valve housing 16 has the cap 10. The cap 10 may be configured to protect the interior of the valve assembly 100. The cap may be configured to protect the film 20 from being directly impacted by debris from the outside environment. The cap 10 can define the second axial end 2 of the valve assembly 100. In alternative embodiments, the cap 10 can be positioned towards the second axial end 2, but does not define the second axial end 2. The cap 10 generally has an inner lateral surface 11 (visible in FIG. 4). The inner lateral surface 11 is generally a relatively planar lateral surface. The inner lateral surface 11 helps define the airflow pathway A.

The valve housing 16 generally has the cap 10 and a valve body 16a that is coupled to the cap 10. In the current example, the cap 10 and the valve body 16a cumulatively define the valve housing 16. In some embodiments consistent with the example depicted, the valve body 16a includes a first portion of the housing sidewall 14a and the cap 10 defines a second portion of the housing sidewall 14b (see FIG. 4). In such embodiments, the cap 10 is configured to be coupled to the first portion of the sidewall 14a of the valve body 16a via the second portion of the sidewall 14b. In some other embodiments, the cap 10 does not include a portion of the housing sidewall 14, and the housing sidewall 14 is entirely a component of the valve body 16a. In yet other embodiments, the housing sidewall 14 is entirely a component of the cap 10 and the valve body 16a does not include a portion of the housing sidewall 14. The housing sidewall 14 generally extends between the inner lateral surface 11 and the first end 1 of the valve assembly 100.

In some embodiments, the cap 10 includes a base 15. The base 15 is generally configured to couple the cap 10 to the body 16a of the valve housing 16. In the current example, the base 15 is defined by a distal end of the second portion of the sidewall 14b. The base 15 is configured to couple to the distal end of the first portion of the sidewall 14a. In some other embodiments, where the cap 10 does not include a portion of the sidewall, the base can be defined by an outer perimetric boundary of the cap 10. The base can be configured to form various types of connections with the valve body 16a. For example, the base 15 can be configured to form a snap fit 9 with the valve body 16a (as illustrated in FIGS. 3-4). In alternative embodiments, the base 15 can be threadably engageable with the valve body 16a. The base 15 can be adhered to the valve body 16a using an adhesive or can be welded to the valve body 16a. Other types of connections are also contemplated such as a bayonet connection, for example. In some alternate embodiments, the cap 10 can form a unitary component with the valve body 16a and thus would lack a base (15).

As illustrated, the base 15 extends laterally outward from the central axis X (illustrated in FIG. 1). Further, the first sidewall portion 14a of the valve body 16a is positioned laterally outward from the second sidewall portion 14b of the cap 10. In alternative embodiments, the base 15 can extend laterally towards the central axis X such that the first sidewall portion 14a of the body 16a is positioned laterally inward relative to the second sidewall portion 14b. In alternative embodiments, the base 15 can define a lateral surface of the cap 10, which faces towards the first axial end 1. In some embodiments the first sidewall portion 14a and the second sidewall portion 14b are not offset in the lateral direction.

The cap 10 generally has the piercing protrusion 12 (12a-c as illustrated in FIGS. 3-6) extending from the inner lateral surface 11 of the cap 10 towards the first axial end 1. The piercing protrusion(s) 12 are generally configured to pierce the film 20. The piercing protrusion(s) 12 can taper towards the first axial end 1. In alternative embodiments, the piercing protrusion(s) can remain at the same width or diameter for at least a portion of the length or for the entire length of the piercing protrusion(s).

The valve assembly 100 is generally configured to allow gases and/or liquids from inside the enclosure E to escape to the outside environment when the environment inside the enclosure E undergoes a relative pressure spike. Upon a pressure event inside the enclosure E that reaches a burst threshold pressure, the film 20 is configured to burst open.

The piercing protrusion(s) 12 can be configured to pierce the film 20 when a pressure differential between the enclosure opening 19 and the environmental opening 18 rises above the burst threshold. The piercing protrusion(s) 12 can have a piercing tip 13 (13a-b illustrated in FIG. 6). The piercing tip(s) 13 may be relatively sharp to pierce the film 20. In alternative embodiments, the piercing tip(s) 13 may be blunted to effectuate tears in the film 20, for example, to increase the area of the film 20 which bursts upon piercing.

In the current example, under normal pressure conditions, the film 20 is generally, although not necessarily perfectly, planar. Upon a pressure spike within the enclosure E above a burst threshold, the pressure expands the film 20 towards the piercing protrusion(s) 12 until the piercing protrusion(s) 12 punctures the film 20. This allows airflow to pass through the film 20 relatively quickly and exit the valve housing 16 through the environmental opening(s) 18. Other valve assembly configurations are contemplated, however.

In some embodiments, the tip(s) 13 of the piercing protrusion(s) 12 can extend beyond the base 15 towards the first axial end 1. The tip(s) 13 can extend beyond the base 15 by at least 1 mm. In alternative embodiments, the tip(s) can extend beyond the base 15 by at least 2 mm, at least 3 mm, at least 4 mm, at least 5 mm, at least 6 mm, at least 7 mm, at least 8 mm, at least 9 mm, or at least 10 mm. In further alternative embodiments, the tip(s) 13 can extend beyond the base 15 by less than less than 10 mm, less than 9 mm, less than 8 mm, less than 7 mm, less than 6 mm, less than 5 mm, less than 4 mm, less than 3 mm, less than 2 mm, or less than 1 mm. In further alternative embodiments, the tip(s) do not extend beyond the base 15.

The valve assembly 100 generally defines an axial distance L between the film 20 and the inner lateral surface 11 of the cap 10 when the film is in a generally planar configuration and/or in an undeflected state. The minimum axial distance L can be configured to accommodate successful bursting of the film 20 at the burst threshold. The minimum axial distance L can be configured to accommodate consistent, predictable bursting of the film 20 across a plurality of valve assemblies 100 at the burst threshold. The axial distance L is generally greater than 4.4 mm. In one embodiment, the axial distance L can be greater than or equal to 6.4 mm. In alternative embodiments, the axial distance L can be at least 5 mm, at least 7 mm, or at least 9 mm. The maximum axial distance is not generally limited except by the space that is configured to accommodate the installed valve assembly 100. In embodiments, the axial distance L can be less than 30 mm, less than less than 27 mm, less than 25 mm, less than 22 mm, less than 20 mm, less than 17 mm, or less than 15 mm.

In the current example a cap height, Z (illustrated in FIG. 4) is defined in the axial direction from the inner lateral surface 11 of the cap 10 across the base 15. The cap height Z generally excludes the length of the piercing protrusion 12 extending beyond the base 15, if any. The cap height Z can be at least 2 mm. In alternative embodiments, the cap height Z can be at least 2 mm, at least 3 mm, at least 4 mm, at least 5 mm, at least 6 mm, at least 7 mm, at least 8 mm, at least 9 mm, at least 10 mm, at least 11 mm, at least 12 mm, at least 13 mm, at least 14 mm, or at least 15 mm. In further alternative embodiments, the cap height Z can be less than 15 mm, less than 14 mm, less than 13 mm, less than 12 mm, less than 11 mm, less than 10 mm, less than 9 mm, less than 8 mm, less than 7 mm, less than 6 mm, less than 5 mm, less than 4 mm, less than 3 mm, or less than 2 mm. However, it will be appreciated that the cap height can be zero in embodiments where the cap does not incorporate a portion of the housing sidewall 14.

A ratio R1 of the axial distance L to the expansion diameter 21 can be selected to increase the likelihood of a successful burst during a high-pressure event. While not wishing to be bound by theory, it is believed that the greater the expansion diameter 21 of the film 20, the greater the axial distance L required to ensure bursting of the film. This is described in more detail with respect to FIGS. 6 and 7, below. The ratio of the axial distance L to the expansion diameter 21 will generally be greater than 0.14. In some embodiments, the ratio of the axial distance L to the expansion diameter 21 is greater than or equal to 0.20, 0.23, or 0.25. The maximum ratio of the axial distance L to the expansion diameter 21 is not particularly limited except by the space that is configured to accommodate the installed valve assembly 100. In embodiments, the ratio of the axial distance L to the expansion diameter 21 can be less than or equal to 1.0, less than or equal to 0.90, less than or equal to 0.80, less than or equal to 0.70, less than or equal to 0.50.

In some embodiments, a ratio R2 of the axial distance L to the expansion area 20a can be selected to increase the likelihood of a successful burst during a high-pressure event. In embodiments, the ratio of the axial distance L to the expansion area can be greater than 0.005, or greater than or equal to 0.007, 0.008 or 0.009, where the expansion area 20a is measured in square mm and the axial distance is measured in mm. The ratio of the axial distance L to the expansion area 20a is not particularly limiting, but can be less than or equal to 0.04 in some embodiments. In embodiments, the ratio of the axial distance L to the expansion area 20a can be, for example, less than or equal to 0.03, or 0.02.

The burst threshold can be at least 50 mbar. In embodiments, the burst threshold can be at least 50 mbar, at least 60 mbar, at least 70 mbar, at least 80 mbar, at least 90 mbar, at least 100 mbar, at least 150 mbar, at least 200 mbar, at least 250 mbar, or at least 300 mbar. In further embodiments, the burst threshold can be less than 300 mbar, less than 250 mbar, less than 200 mbar, less than 150 mbar, less than 100 mbar, less than 90 mbar, less than 80 mbar, less than 70 mbar, less than 60 mbar, or less than 50 mbar.

Airflow through the airflow pathway A is generally configured to increase after the film 20 is pierced compared to airflow through the airflow pathway A before the film 20 is pierced. Such increase in airflow may be configured to relieve pressure relatively quickly during a high-pressure event in the enclosure to which the valve assembly is coupled. In embodiments where the film is breathable, airflow through the airflow pathway A can be configured to increase by at least 12 times after the film 20 is pierced compared to airflow through the airflow pathway A before the film 20 is pierced. Such increase in airflow is calculated at a set pressure differential of 100 mbar and a temperature of 25 degrees Celsius. The pressure differential is measured between the pressure of the ambient environment and the pressure of the enclosure to which the valve assembly is coupled.

For example, a maximum airflow through the valve assembly 100 before the film 20 is pierced may be 6.4 standard liters per minute (SLPM). A minimum airflow through the valve assembly 100 after the film 20 is pierced may be 600 SLPM. Thus, the airflow is increased by at least 94 times. In another example, the maximum airflow through the valve assembly 100 before the film 20 is pierced may be 44 SLPM. The minimum airflow through the valve assembly 100 after the film 20 is pierced may be 600 SLPM. Thus, the airflow is increased by at least 13 times. In alternative embodiments, airflow can be configured to increase by at least 25 times, at least 50 times, at least 60 times, at least 75 times, at least 100 times, at least 150 times, at least 200 times, at least 300 times, or at least 400 times after the film 20 is pierced compared to airflow before the film 20 is pierced. In further alternative embodiments, airflow can be configured to increase by less than 400 times, less than 300 times, less than 200 times, less than 150 times, less than 100 times, less than 75 times, less than 60 times, less than 50 times, or less than 25 times after the film 20 is pierced compared to airflow before the film 20 is pierced. In each of the examples the airflow is measured at a pressure differential of 100 mbar.

Figure 6:
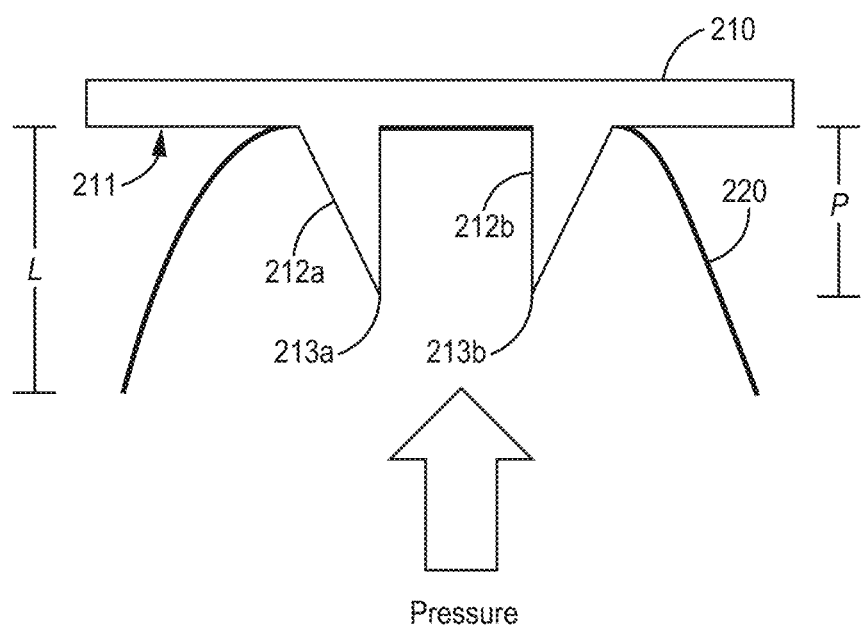
FIG. 6 is a schematic side view of another embodiment of a valve assembly and illustrates increasing pressure.
Figure 7:
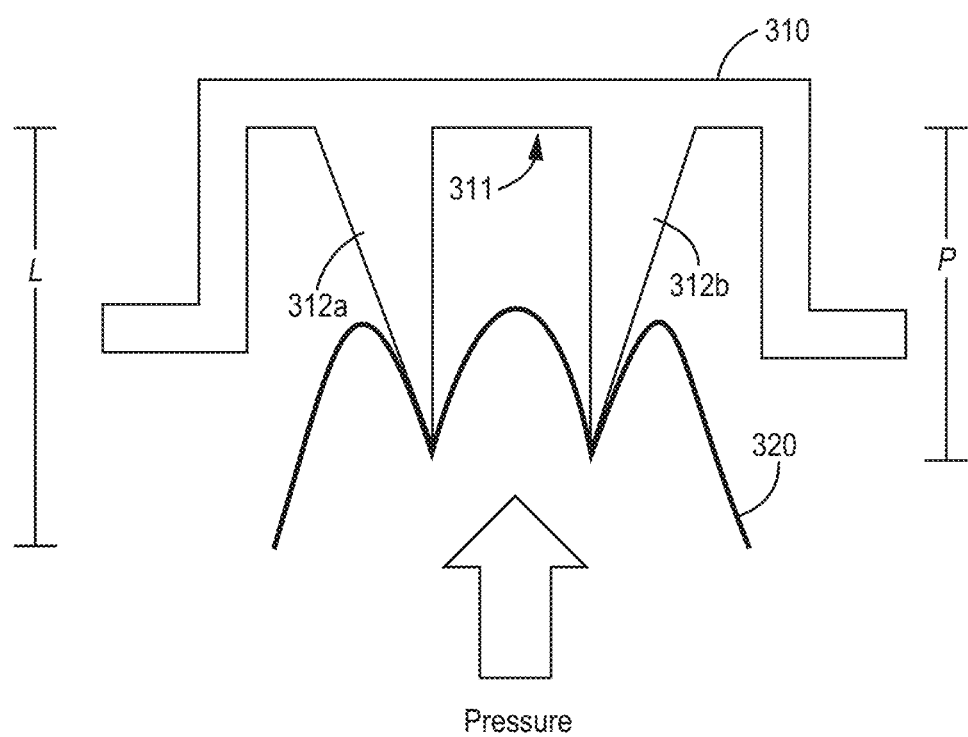
FIG. 7 is a schematic side view consistent with the example of FIG. 1 and illustrates increasing pressure.

Schematics of FIGS. 6 and 7 can help illustrate the difference that the axial distance L between the film and an inner lateral surface of the cap can have on the ability of the film 220/320 to successfully burst (by puncture from a piercing protrusion(s) and a tip(s)). In FIG. 6, a schematic cap 210 having an inner lateral surface 211 is illustrated. The axial distance L of the valve assembly when the film 220 is generally planar is illustrated. As the pressure differential acting on the film 220 rises, the film 220 flexes or expands from a generally horizontal position to the position as illustrated in FIG. 6. The inner lateral surface 211 provides structural support to the film 220 such that the piercing protrusion(s) 212 fails to puncture the film 220. Instead, the film 220 surrounds the piercing protrusion(s) 212 and the tip(s) 213 and settles against the inner lateral surface 211 of the cap 210. The inner lateral surface 211 opposes the force of the pressure on the film 220. Thus, the film 220 may not reliably burst at or above the burst threshold.

FIG. 7 illustrates an embodiment is consistent with the technology disclosed herein. The axial distance L is greater than the axial distance depicted above with reference to FIG. 6. In the current example, the relatively increased axial distance L between the inner lateral surface 311 and the film 320 reduces the opportunity for the inner lateral surface 311 to provide structural support to the film 320 that would oppose the forces on the film resulting from a high-pressure event. Instead, the film 320 encounters the piercing protrusion(s) 312 and the tip(s) 313, continues to expand or flex during the high-pressure event, and without the support of the inner lateral surface 311 or any other support, the film 320 is successfully punctured and bursts. This allows pressure release during a high-pressure event.

Returning again to FIGS. 1-4, upon puncturing of the film 20, the film 20 bursts in a single opening, or bursts in multiple openings created in the film 20. Airflow through the burst film 20 is generally related to (1) the pressure differential between the housing and the ambient environment and (2) the total flow area defined by the burst opening or openings in the film 20. The ability of the piercing protrusion(s) 12 to pierce the film 20 is generally related to (1) the expansion diameter of the film and (2) the axial distance L between the inner lateral surface and the film 20. Some other factors which can influence the ability of the piercing protrusion(s) 12 to pierce the film 20 include (a) a distance Y (see FIG. 4) between the film 20 and the piercing protrusion(s) 12, (b) a piercing protrusion length P, (c) a void space 17 (illustrated in FIG. 3), (d) breathability of the film 20, (e) other material properties of the film 20, (f) an angle of the piercing tip(s), and (g) the location of the piercing tip(s) relative to the expansion area 20a of the film 20. Some of these factors are discussed further herein.

The valve assembly 100 may define the distance Y between the film 20 and the piercing protrusion(s) 12. The distance Y may be configured to allow the film 20 to flex or expand such that the film 20 is not punctured unless there is a high-pressure event in the valve housing 16. The distance Y may also be configured to allow the film 20 to flex or expand such that the film 20 has an increased surface tension and thus the film 20 is more easily punctured by the piercing protrusion(s) 12. The distance Y can be 1 mm to 3 mm. In alternative embodiments, the distance Y between the film 20 and the piercing protrusion(s) 12 can be at least 1 mm, at least at least 2 mm, at least 3 mm, at least 4 mm, at least 5 mm, at least 6 mm, at least 7 mm, at least 8 mm, at least 9 mm, or at least 10 mm. In further alternative embodiments, the distance Y between the film 20 and the piercing protrusion(s) 12 can be less than less than 10 mm, less than 9 mm, less than 8 mm, less than 7 mm, less than 6 mm, less than 5 mm, less than 4 mm, less than 3 mm, less than 2 mm, or less than 1 mm. In further alternative embodiments, the distance Y is 0 mm.

The valve assembly may define the piercing protrusion length P between the inner lateral surface 11 of the cap 10, and the tip(s) 13 of the piercing protrusion(s) 12. The piercing protrusion length P may be configured to enable relatively consistent and successful bursting of the film 20 at the burst threshold. Such piercing protrusion length can be at least 2 mm. In alternative embodiments, the distance P between the inner lateral surface 11 and the tip(s) 13 can be at least 1 mm, at least at least 2 mm, at least 3 mm, at least 4 mm, at least 5 mm, at least 6 mm, at least 7 mm, at least 8 mm, at least 9 mm, at least 10 mm, or at least 15 mm. In further alternative embodiments, the distance P between the inner lateral surface 11 and the tip(s) 13 can be less than 15 mm, less than less than 10 mm, less than 9 mm, less than 8 mm, less than 7 mm, less than 6 mm, less than 5 mm, less than 4 mm, less than 3 mm, less than 2 mm, or less than 1 mm.

The valve assembly 100 can define a void space 17. The void space 17 is generally configured to allow for flexing or expansion of the film 20 when there is a relatively increased pressure applied to the film 20 through the enclosure opening 19. The void space 17 is also configured to limit forces on the film 20 that oppose the force of the pressure differential on the film 20. The void space 17 has no components inhabiting its space. The void space 17 is defined among the piercing protrusion(s) 12, the housing sidewall 14, the inner lateral surface 11, and the expansion area 20a of the film 20. In some embodiments, the void space 17 is defined among the piercing protrusion(s) 12, the housing sidewall 14, the inner lateral surface 11, and the circular region defined by the expansion diameter 21. Omitting structures or components in the void space 17 reduces potential forces that may oppose flexing or expansion of the film 20. The void space is generally configured such that the film 20 is consistently pierced by the piercing protrusion(s) 12 at the burst threshold in a group of vent assemblies.

Figure 8:
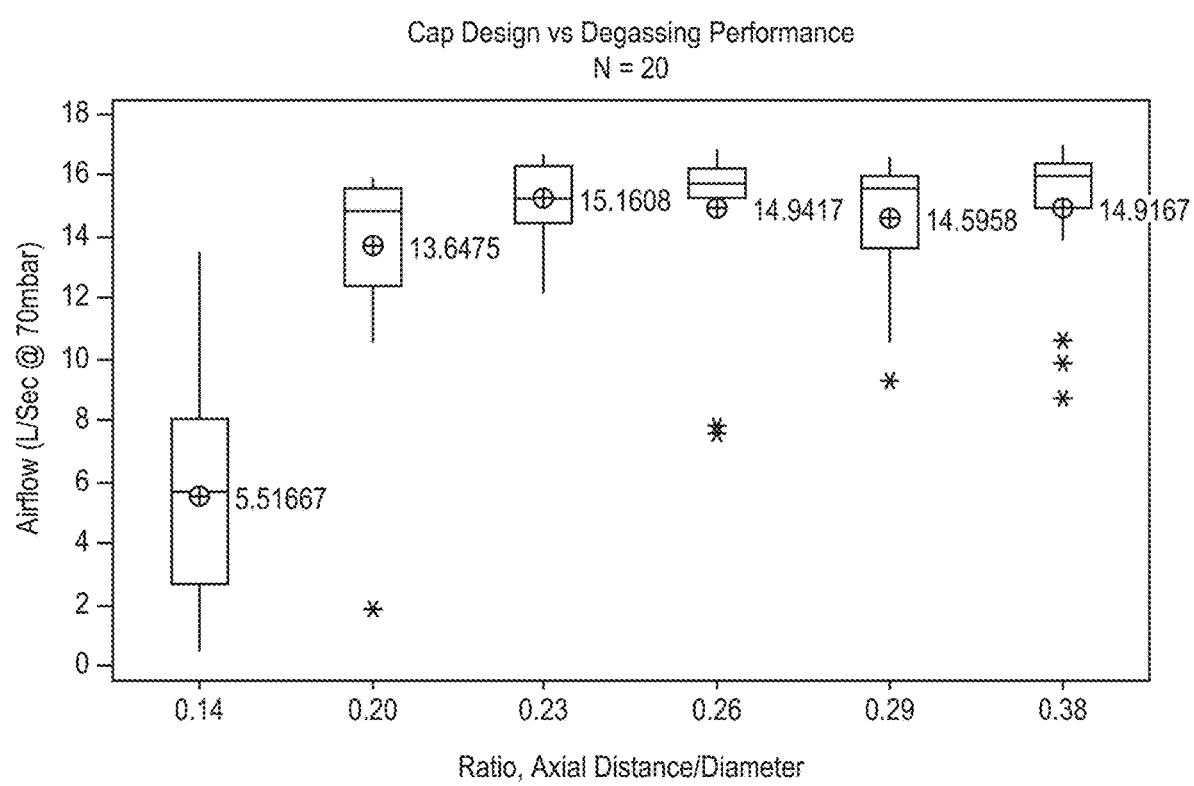
FIG. 8 is an exemplary graph depicting performance data.

FIG. 8 depicts a graph demonstrating the relationship between (1) the ratio of the expansion diameter 21 of the film and the axial distance L (between the inner lateral surface of the cap and the film) and (2) airflow through a valve assembly in response to a burst threshold pressure differential. Valve assemblies tested have configurations generally consistent with FIGS. 1-4. The valve assemblies were generally identical except that the axial distance L was varied such that six different axial distances L were tested, which are reflected below in Table 1. The test was performed on 20 valve assemblies (N=20) for each of the six axial distances L tested at room temperature (23° C.).

TABLE 1

Valve assemblies having the above axial distances and corresponding ratios of (1) the axial distance/expansion diameter and (2) the axial distance/expansion area.

| Axial Distance L (mm) | Ratio, R1, axial distance/expansion diameter | Ratio, R2, axial distance/expansion area |
|---|---|---|
| 4.4 | 0.14 | 0.005 |
| 6.4 | 0.20 | 0.008 |
| 7.4 | 0.23 | 0.009 |
| 8.4 | 0.26 | 0.010 |
| 9.4 | 0.29 | 0.011 |
| 12.4 | 0.38 | 0.015 |

For each of the vent assemblies tested, the film is a breathable membrane. The film is circular, and the expansion diameter of the film of each valve assembly is 32.5 mm as measured across the expansion area 20a of the film 20 (such that the expansion area 20a of the film 20 has a total flow area of 829.58 square mm). Each valve assembly 100 was tested at a threshold pressure differential of 70 mbar.

For each group of vent assemblies of the six different axial distances L, the mean degassing airflow of the data set is displayed numerically (in liters/second) and with a crosshair icon. The interquartile range (representing 50% of the total raw data) is represented by the rectangular boxes, and the median degassing airflow is graphically represented with a horizontal line through each box. The upper and lower 25% of the data distribution is represented by the vertical lines extending from the box. The asterisks represent outlier data points. The axial distance L is increased from left to right along the x-axis as illustrated in FIG. 8, while the expansion diameter is constant, resulting in an increasing axial distance-to-expansion diameter ratio from left to right along the x-axis. The axial distances L considered are 4.4 mm, 6.4 mm, 7.4 mm, 8.4 mm, 9.4 mm, and 12.4 mm as illustrated from left to right.

The initial data set (corresponding to an axial distance L of 4.4 mm and a ratio of 0.14) demonstrates a mean airflow upon exposure to the threshold pressure differential across the film that is below 10 L/sec. The data distribution shows that the airflow approaches zero for at least some samples, suggesting that the film was not successfully punctured for one or more samples and that some samples may have been successfully punctured but had relatively small puncture openings through the film. Each of the remaining data sets (corresponding to axial distances of 6.4 mm-12.4 mm, or ratios of 0.20-0.38) result in airflow above 10 L/sec after the film 20 is successfully punctured. Thus, the ratios above 0.14 result in relatively higher resulting airflow through the valve assembly 100 after the film 20 is punctured in response to a high-pressure event in the valve housing 16 compared to the valve assembly having a ratio of 0.14. Valve assemblies having ratios above 0.20 demonstrate even higher resulting airflow, suggesting more reliable puncturing and/or relatively larger puncture openings. For valve assemblies having ratios above 0.20, the outlying data points of the minimum airflow exceed 7 L/sec. As such, valve assemblies having a ratio of greater than 0.20 may be desirable in some implementations.

Further testing of degassing performance was conducted for assemblies having three axial distances L of 4.4 mm, 12.4 mm, and 7.6 mm, corresponding to R1 ratios of 0.14, 0.38, and 0.23, respectively. Degassing performance was assessed at two different temperatures: 23° C. and 125° C. and the results are reflected in FIG. 9. Valve assemblies tested had configurations consistent with those described above with respect to FIG. 8.

Figure 9:
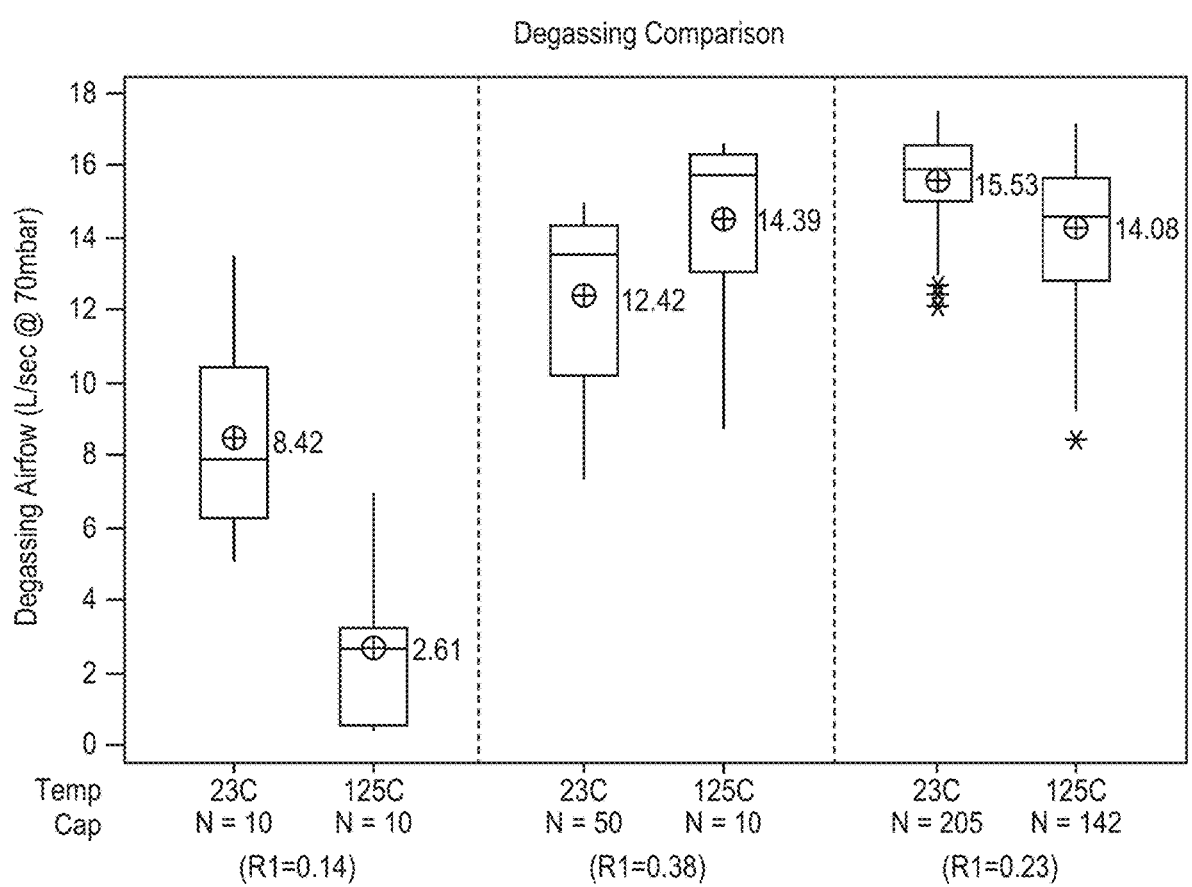
FIG. 9 is another exemplary graph depicting performance data.

As with the collected data described with reference to FIG. 8, in FIG. 9, the mean degassing airflow of the data set is displayed numerically (in liters/second) and with a crosshair icon. The interquartile range (representing 50% of the total raw data) is represented by the rectangular boxes, and the median degassing airflow is graphically represented with a horizontal line through each box. The upper and lower 25% of the data distribution is represented by the vertical lines extending from the box. The asterisks represent outlier data points.

The data set for the assemblies having an axial distance L of 4.4 mm and a ratio of 0.14 demonstrates a mean airflow upon exposure to the threshold pressure differential across the film that is generally below 10 L/sec at both tested temperatures. The assemblies having an axial distance of 7.6 mm and 12.4 mm generally had relatively higher resulting airflow through the valve assembly 100 after the film 20 is punctured in response to a high-pressure event in the valve housing 16 compared to the valve assembly having a ratio of 0.14.

Figure 10:
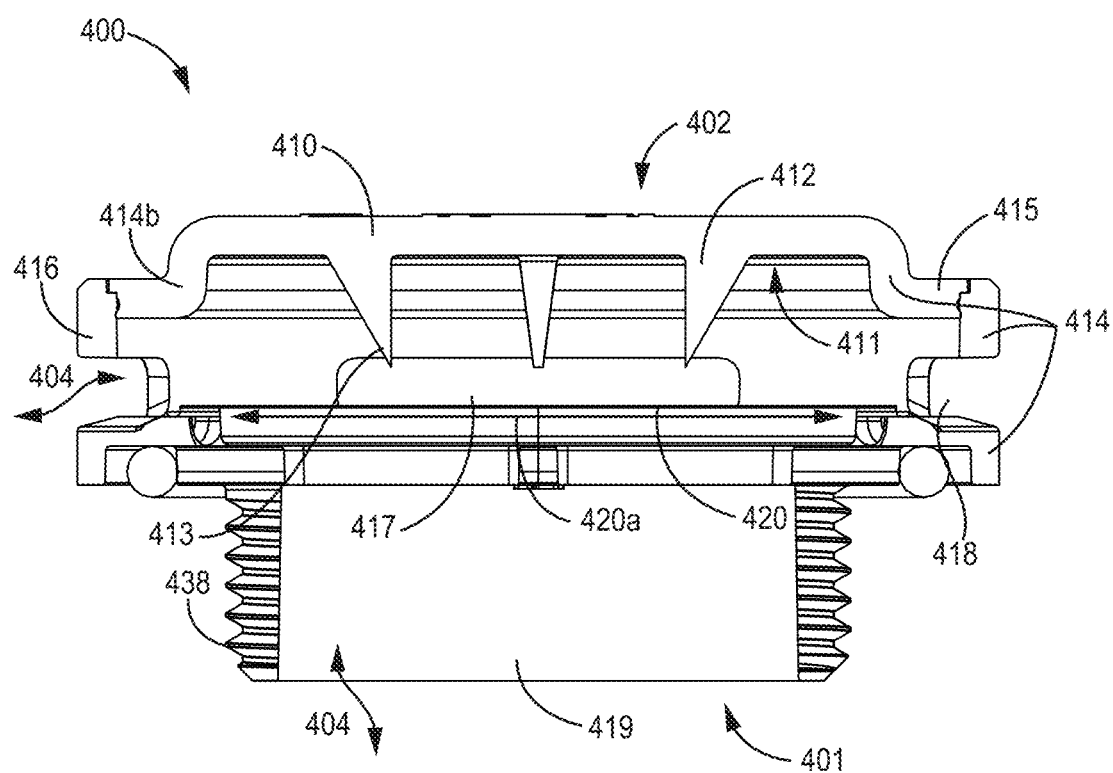
FIG. 10 is another example valve assembly consistent with various embodiments.

FIG. 10 is another example valve assembly 400 consistent with the technology disclosed herein. The valve assembly 400 has components, configurations and functions that are generally consistent with those described above with reference to FIGS. 1-4 unless contrary to the current description or figure. As such, the description of FIGS. 1-4 is incorporated by reference herein with respect to FIG. 10.

The valve assembly 400 generally has a valve housing 416. The valve housing 416 has a first axial end 401, a second axial end 402, and an airflow pathway 404 extending from the first axial end 401 towards the second axial end 402. The valve housing 416 defines an environmental opening 418 configured for fluid communication with an outside environment. The valve housing 416 defines an enclosure opening 419 towards the first axial end 401. The enclosure opening 419 is configured for fluid communication with an interior of an enclosure (not currently depicted; see other examples described above). The valve housing 416 generally has a housing sidewall 414 extending in the axial direction.

In the current example, the valve housing 416 has a mounting structure 438 that has an alternate configuration from that depicted in FIGS. 1-4. The mounting structure 438 includes outer circumferential threads. The outer circumferential threads are configured to be received by inner circumferential threads defined by an enclosure or by an interfacing component that ultimately is coupled to an enclosure. It will be appreciated that the mounting structure 438 can have alternate configurations such as those described above. The mounting structure 438 can alternately define bayonet connectors, a snap fit, fastener openings configured to be aligned with mating fastener openings that are configured to receive a fastener, a laterally extending surface configured to be welded to or otherwise adhered to an enclosure, and the like.

The valve housing 416 also has a cap 410 positioned towards the second axial end 402. The cap 410 has an inner lateral surface 411. The housing sidewall 414 extends from the inner lateral surface 411 towards the first axial end 401. In some embodiments, the cap 410 has a cap sidewall 414b extending from the inner lateral surface 411 towards the first axial end 401. In such embodiments, the cap sidewall 414b defines a cap height.

The cap 410 has a piercing protrusion 412 extending from the inner lateral surface 411 towards the first axial end 401. Each piercing protrusion 412 has a piercing tip 413. The piercing protrusion 412 can taper towards the first axial end 401, in various embodiments. The piercing protrusion 412 can have a length of at least 4 mm in various embodiments. The cap 410 has a cap base 415. The cap base 415 is configured to couple to the body 416b of the valve housing 416. The cap sidewall 414b extends from the inner lateral surface 411 to the cap base 415. In various embodiments, the piercing protrusion 412 extends beyond the cap base 415 towards the first axial end 401 by at least 1 mm. The cap 410 can have a cap height of at least 4 mm in various embodiments, where the cap height is the distance from the inner lateral surface 411 across the base 415.

The valve assembly 400 has a film 420 disposed in the valve housing 416 laterally across the airflow pathway 404. The film 420 is disposed in the valve housing 416 along the airflow pathway 404 between the enclosure opening 419 and the environmental opening 418. In some embodiments the film 420 is a breathable membrane. In some other embodiments the film 420 is non-breathable. The film 420 generally has an expansion diameter 420a defining an expansion area having a surface area of 450 square mm to 1500 square mm. In some embodiments the film 420 expansion diameter is at least 32.5 mm.

The piercing protrusion 412 is generally configured to pierce the film 420 when a pressure differential between the enclosure opening 419 and the environmental opening 418 rises above a burst threshold. The burst threshold can be at least 50 mbar, in some embodiments. A distance between the film 420 and the piercing protrusion 412 can be 1 mm to 3 mm in some embodiments. In some embodiments, airflow through the airflow pathway 404 is configured to increase by at least 12 times after the film 420 is pierced compared to airflow through the airflow pathway 404 before the film 420 is pierced.

There is generally an axial distance L defined between the film 420 and the inner lateral surface 411 of the cap 410. In various embodiments the axial distance L is greater than 4.4 mm. In some embodiments the axial distance L is at least 7.4 mm. In various embodiments, a ratio of the axial distance L to the film expansion diameter 420a is greater than 0.14. In various embodiments, the ratio of the axial distance L to the expansion diameter 420a is at least 0.20. In various embodiments, a void space 417 is defined among the piercing protrusion 412, the housing sidewall 414 the inner lateral surface 411, and the film 420.

Exemplary Aspects

Aspect 1. A valve assembly comprising:
a valve housing having:
    a first axial end, a cap, a second axial end, and an airflow pathway extending from the first axial end towards the second axial end, wherein the cap is positioned towards the second axial end,
    an environmental opening configured for fluid communication with an outside environment, and
    an enclosure opening towards the first axial end configured for fluid communication with an interior of an enclosure; and
a film disposed in the valve housing laterally across the airflow pathway and along the airflow pathway between the enclosure opening and the environmental opening,
    wherein the cap comprises an inner lateral surface and a piercing protrusion extending from the inner lateral surface of the cap towards the first axial end, and wherein the piercing protrusion comprises a piercing tip, and
    wherein an axial distance between the film and the inner lateral surface of the cap is greater than 4.4 mm.

Aspect 2. The valve assembly of any one of Aspects 1 and 3-16, wherein the axial distance between the film and the inner lateral surface of the cap is at least 7.4 mm.

Aspect 3. The valve assembly of any one of Aspects 1-2 and 4-16, wherein the piercing protrusion is configured to pierce the film when a pressure differential between the enclosure opening and the environmental opening rises above a burst threshold.

Aspect 4. The valve assembly of any one of Aspects 1-3 and 5-16, wherein the burst threshold is at least 50 mbar.

Aspect 5. The valve assembly of any one of Aspects 1-4 and 6-16, wherein a distance between the film and the piercing protrusion is 1 mm to 3 mm.

Aspect 6. The valve assembly of any one of Aspects 1-5 and 7-16, wherein a length of the piercing protrusion is at least 2 mm.

Aspect 7. The valve assembly of any one of Aspects 1-6 and 8-16, wherein the cap comprises a cap sidewall extending from the inner lateral surface towards the first axial end, and wherein the cap sidewall defines a cap height.

Aspect 8. The valve assembly of any one of Aspects 1-7 and 9-16, wherein the cap comprises a cap base, the cap sidewall extends from the inner lateral surface to the cap base, and the piercing protrusion extends beyond the cap base towards the first axial end by at least 1 mm.

Aspect 9. The valve assembly of any one of Aspects 1-8 and 10-16, wherein the cap height is at least 2 mm.

Aspect 10. The valve assembly of any one of Aspects 1-9 and 11-16, wherein the valve housing further comprises a housing sidewall extending between the inner lateral surface and the first axial end.

Aspect 11. The valve assembly of any one of Aspects 1-10 and 12-16, further comprising a void space defined among the piercing protrusion, the housing sidewall, the inner lateral surface, and the film.

Aspect 12. The valve assembly of any one of Aspects 1-11 and 13-16, wherein the film comprises a breathable membrane.

Aspect 13. The valve assembly of any one of Aspects 1-12 and 14-16, wherein airflow through the airflow pathway is configured to increase by at least 12 times after the film is pierced compared to airflow through the airflow pathway before the film is pierced.

Aspect 14. The valve assembly of any one of Aspects 1-13 and 15-16, wherein the film comprises a non-breathable membrane.

Aspect 15. The valve assembly of any one of Aspects 1-14 and 16, wherein a surface area of an expansion area of the film is 450 square mm to 1500 square mm.

Aspect 16. The valve assembly of any one of Aspects 1-15, wherein the piercing protrusion tapers towards the first axial end.

Aspect 17. A valve assembly comprising:
a valve housing having:
a first axial end, a cap, a second axial end, and an airflow pathway extending from the first axial end towards the second axial end, wherein the cap is positioned towards the second axial end,
an environmental opening configured for fluid communication with an outside environment, and
an enclosure opening towards the first axial end configured for fluid communication with an interior of an enclosure; and
a film disposed in the valve housing laterally across the airflow pathway and along the airflow pathway between the enclosure opening and the environmental opening, wherein the film has an expansion diameter,
wherein the cap comprises an inner lateral surface and a piercing protrusion extending from the inner lateral surface of the cap towards the first axial end, and wherein the piercing protrusion comprises a piercing tip,
wherein an axial distance is defined between the film and the inner lateral surface, and
wherein a ratio of the axial distance to the film expansion diameter is greater than 0.14.

Aspect 18. The valve assembly of any one of Aspects 17-34, wherein the axial distance between the film and the inner lateral surface of the cap is at least 7.4 mm.

Aspect 19. The valve assembly of any one of Aspects 17-18 and 20-34, wherein the ratio of the axial distance to the expansion diameter is at least 0.228.

Aspect 20. The valve assembly of any one of Aspects 17-19 and 21-34, wherein the piercing protrusion is configured to pierce the film when a pressure differential between the enclosure opening and the environmental opening rises above a burst threshold.

Aspect 21. The valve assembly of any one of Aspects 17-20 and 22-34, wherein the burst threshold is at least 50 mbar.

Aspect 22. The valve assembly of any one of Aspects 17-21 and 23-34, wherein a distance between the film and the piercing protrusion is 1 mm to 3 mm.

Aspect 23. The valve assembly of any one of Aspects 17-22 and 24-34, wherein a length of the piercing protrusion is at least 2 mm.

Aspect 24. The valve assembly of any one of Aspects 17-23 and 25-34, wherein the cap comprises a cap sidewall extending from the inner lateral surface towards the first axial end, and wherein the cap sidewall defines a cap height.

Aspect 25. The valve assembly of any one of Aspects 17-24 and 26-34, wherein the cap comprises a cap base, the cap sidewall extends from the inner lateral surface to the cap base, and the piercing protrusion extends beyond the cap base towards the first axial end by at least 1 mm.

Aspect 26. The valve assembly of any one of Aspects 17-25 and 27-34, wherein the cap height is at least 2 mm.

Aspect 27. The valve assembly of any one of Aspects 17-26 and 28-34, wherein the valve housing further comprises a housing sidewall extending between the inner lateral surface and the first axial end.

Aspect 28. The valve assembly of any one of Aspects 17-27 and 29-34, further comprising a void space defined among the piercing protrusion, the housing sidewall, the inner lateral surface, and the film.

Aspect 29. The valve assembly of any one of Aspects 17-28 and 30-34, wherein the film comprises a breathable membrane.

Aspect 30. The valve assembly of any one of Aspects 17-29 and 31-34, wherein airflow through the airflow pathway is configured to increase by at least 12 times after the film is pierced compared to airflow through the airflow pathway before the film is pierced.

Aspect 31. The valve assembly of any one of Aspects 17-30 and 32-34, wherein the film comprises a non-breathable membrane.

Aspect 32. The valve assembly of any one of Aspects 17-31 and 33-34, wherein the film expansion diameter is at least 32.5 mm.

Aspect 33. The valve assembly of any one of Aspects 17-32 and 34, wherein a surface area of an expansion area of the film is 450 square mm to 1500 square mm.

Aspect 34. The valve assembly of any one of Aspects 17-33, wherein the piercing protrusion tapers towards the first axial end.

What is claimed is:
1. A valve assembly comprising:
a valve housing having:
a first axial end, a cap, a second axial end, and an airflow pathway extending from the first axial end towards the second axial end, wherein the cap is positioned towards the second axial end,
an environmental opening configured for fluid communication with an outside environment, and
an enclosure opening towards the first axial end configured for fluid communication with an interior of an enclosure; and
a film disposed in the valve housing laterally across the airflow pathway and along the airflow pathway between the enclosure opening and the environmental opening, wherein the film comprises a perimetric region that has a fixed position relative to the cap,
wherein the cap comprises an inner lateral surface and a piercing protrusion extending from the inner lateral surface of the cap towards the first axial end, and wherein the piercing protrusion comprises a piercing tip, and
wherein an axial distance between the film and the inner lateral surface of the cap is greater than 4.4 mm.

2. The valve assembly of claim 1, wherein the axial distance between the film and the inner lateral surface of the cap is at least 7.4 mm.

3. The valve assembly of claim 1, wherein the piercing protrusion is configured to pierce the film when a pressure differential between the enclosure opening and the environmental opening rises above a burst threshold, wherein the burst threshold is at least 50 mbar.

4. The valve assembly of claim 1, wherein a distance between the film and the piercing protrusion is 1 mm to 3 mm.

5. The valve assembly of claim 1, wherein a length of the piercing protrusion is at least 2 mm.

6. The valve assembly of claim 1, wherein the cap comprises a cap sidewall extending from the inner lateral surface towards the first axial end, and wherein the cap sidewall defines a cap height that is at least 2 mm.

7. The valve assembly of claim 6, wherein the cap comprises a cap base, the cap sidewall extends from the inner lateral surface to the cap base, and the piercing protrusion extends beyond the cap base towards the first axial end by at least 1 mm.

8. The valve assembly of claim 1, wherein the valve housing further comprises a housing sidewall extending between the inner lateral surface and the first axial end.

9. The valve assembly of claim 8, further comprising a void space defined among the piercing protrusion, the housing sidewall, the inner lateral surface, and the film.

10. The valve assembly of claim 1, wherein a surface area of an expansion area of the film is 450 square mm to 1500 square mm.

11. A valve assembly comprising:
   a valve housing having:
      a first axial end, a cap, a second axial end, and an airflow pathway extending from the first axial end towards the second axial end, wherein the cap is positioned towards the second axial end,
      an environmental opening configured for fluid communication with an outside environment, and
      an enclosure opening towards the first axial end configured for fluid communication with an interior of an enclosure; and
   a film disposed in the valve housing laterally across the airflow pathway and along the airflow pathway between the enclosure opening and the environmental opening, wherein the film has an expansion diameter, wherein the film comprises a perimetric region that has a fixed position relative to the cap,
   wherein the cap comprises an inner lateral surface and a piercing protrusion extending from the inner lateral surface of the cap towards the first axial end, and wherein the piercing protrusion comprises a piercing tip,
   wherein an axial distance is defined between the film and the inner lateral surface, and wherein a ratio of the axial distance to the film expansion diameter is greater than 0.14.

12. The valve assembly of claim 11, wherein the axial distance between the film and the inner lateral surface of the cap is at least 7.4 mm.

13. The valve assembly of claim 11, wherein the ratio of the axial distance to the expansion diameter is at least 0.20.

14. The valve assembly of claim 11, wherein the piercing protrusion is configured to pierce the film when a pressure differential between the enclosure opening and the environmental opening rises above a burst threshold of at least 50 mbar.

15. The valve assembly of claim 11, wherein a distance between the film and the piercing protrusion is 1 mm to 3 mm.

16. The valve assembly of claim 11, wherein a length of the piercing protrusion is at least 2 mm.

17. The valve assembly of claim 11, wherein the cap comprises a cap sidewall extending from the inner lateral surface towards the first axial end, and wherein the cap sidewall defines a cap height of at least 2 mm.

18. The valve assembly of claim 11, wherein the valve housing further comprises a housing sidewall extending between the inner lateral surface and the first axial end, and a void space defined among the piercing protrusion, the housing sidewall, the inner lateral surface, and the film.

19. The valve assembly of claim 11, wherein the film expansion diameter is at least 32.5 mm.

20. The valve assembly of claim 11, wherein a surface area of an expansion area of the film is 450 square mm to 1500 square mm.

* * * * *